(12) United States Patent
Roose

(10) Patent No.: US 8,534,415 B2
(45) Date of Patent: Sep. 17, 2013

(54) CENTER-PIVOT STEERING ARTICULATED VEHICLE WITH LOAD LIFTING TRAILER

(75) Inventor: Gerald L. Roose, Pella, IA (US)

(73) Assignee: Roose Mfg. Company, Pella, IA (US)

( * ) Notice: Subject to any disclaimer, the term of this patent is extended or adjusted under 35 U.S.C. 154(b) by 205 days.

(21) Appl. No.: 13/088,884

(22) Filed: Apr. 18, 2011

(65) Prior Publication Data

US 2011/0194921 A1   Aug. 11, 2011

Related U.S. Application Data

(63) Continuation-in-part of application No. 12/509,838, filed on Jul. 27, 2009, now Pat. No. 8,002,074.

(51) Int. Cl.
*B62D 13/02*   (2006.01)

(52) U.S. Cl.
USPC ............ 180/418; 180/419; 180/420; 180/421

(58) Field of Classification Search
USPC .......................................... 180/418, 419, 420
See application file for complete search history.

(56) References Cited

U.S. PATENT DOCUMENTS

| | | | | |
|---|---|---|---|---|
| 3,642,324 | A | * | 2/1972 | Conner ........................... 298/11 |
| 4,504,184 | A | * | 3/1985 | Beam et al. ................... 414/498 |
| 4,552,341 | A | * | 11/1985 | Zucker et al. ..................... 256/1 |
| 5,632,350 | A | | 5/1997 | Gauvin |
| 5,908,081 | A | | 6/1999 | Olson |
| 6,116,697 | A | * | 9/2000 | Smith et al. ................. 298/22 R |

OTHER PUBLICATIONS

"3-Wheel Tractor Sprayer Attachments", www.agriweld.com/pages/applicator_3W6410.html. Article and close-up of the steering unit.

* cited by examiner

*Primary Examiner* — Tashiana Adams
*Assistant Examiner* — Marlon Arce
(74) *Attorney, Agent, or Firm* — McKee, Voorhees & Sease, P.L.C.

(57) ABSTRACT

The center-pivot vehicle has forward and rearward sections with traversing means for traversing terrain. A rotary actuator connects the forward and rearward sections. Rotation of the rotary actuator articulates the forward and rearward sections relative to each other for steering the vehicle. One of the sections includes a bed operably attached to a bed frame that is operably attached to a trailer frame for actuated movement between trailing and loading positions. The bed is pivotally attached to the bed frame for moving between tilted and non-tilted positions.

17 Claims, 6 Drawing Sheets

CENTER-PIVOT STEERING ARTICULATED VEHICLE WITH LOAD LIFTING TRAILER

CROSS-REFERENCE TO RELATED APPLICATIONS

This application is a Continuation-in-Part of U.S. Ser. No. 12/509,838 filed Jul. 27, 2009, herein incorporated by reference in its entirety.

FIELD OF THE INVENTION

The present invention relates to an apparatus and method for a center-pivot vehicle. More specifically, the present invention relates to an apparatus and method for articulating a center-pivot vehicle having a load lifting trailer with a bed both moveable between trailing and loading positions and tiltable between loading and unloading positions relative to the frame.

BACKGROUND OF THE INVENTION

It is well-known that center-pivot vehicles have the advantage of being extremely maneuverable. Other advantages of center-pivot vehicles include exact steering geometries, rear wheels tract with front wheels, tighter turning radius over common axle pivot steering, and the ability to move the forward and rearward sections even if the vehicle is not moving.

Typically, center-pivot vehicles have forward and rearward sections hinged together. Articulation of the sections is often provided by one or more hydraulic cylinders. For example, one cylinder on one side of the hinge expands while another cylinder on the opposite side of the hinge contracts for articulating the forward section relative to the rearward section for turning the vehicle.

Current systems for providing center-pivoting of a vehicle are bulky, have limited operating parameters, require an excessive amount of power to operate, and are expensive to build and to operate. Because of the interlinking between the forward and rearward sections, this type of center-pivot system limits the operating independency of the forward and rearward sections, which in turn limits the stability of these sections and the amount each is able to pitch and roll relative to the other. Invariably, the ability of the forward and rearward sections of a center-pivot vehicle to pitch and roll freely is retarded by the structure or functionality providing center-pivoting.

Therefore, it is a primary object, feature or advantage of the present invention to improve over the state of the art.

It is a further object, feature or advantage of the present invention to provide an apparatus and method for a center-pivot steering articulated vehicle wherein the system providing articulation is non-bulky, inexpensive to build, operate and maintain.

Yet another object, feature or advantage of the present invention is to provide an apparatus and method for a center-pivot steering articulated vehicle wherein the system providing articulation has limited moving parts interlinking forward and rearward sections of the vehicle.

A further object, feature or advantage of the present invention is to provide an apparatus and method for a center-pivot steering articulated vehicle wherein the system providing articulation has a minimal power requirement.

Another object, feature or advantage of the present invention is to provide an apparatus and method for a center-pivot steering articulated vehicle wherein the system providing articulation provides operating independency of forward and rearward sections for increased stability, tracking, and handling.

Yet another object, feature or advantage of the present invention is to provide an apparatus and method for a center-pivot steering articulated vehicle wherein the system providing articulation allows for forward and rearward section dependency whereby both sections remain solidly grounded and true to the terrain regardless of the terrain.

A further object, feature or advantage of the present invention is to provide an apparatus and method for a center-pivot steering articulated vehicle wherein the pitch and roll of the forward and rearward sections are independent of articulation of the forward and rearward sections.

Another object, feature or advantage of the present invention is to provide an apparatus and method for a center-pivot steering articulated vehicle wherein the system providing articulation is a single self-contained unit for simplicity, cost savings and ease of operation and troubleshooting.

U.S. Pat. No. 6,273,435 shows a trailer with a non-tilting moveable bed. This trailer includes a hydraulic cylinder which is connected to a linkage between a base and bed frame. Extension of the hydraulic cylinder causes the linkage to articulate and causes movement of the bed frame relative to the base frame. The bed frame is guided in a series of tracks between an elevated position and a lowered position.

The device of U.S. Pat. No. 6,273,435 has the disadvantage of requiring a complicated mechanical linkage between a hydraulic cylinder bed frame and the base frame. Furthermore, the hydraulic cylinder rises and powers in unison with the bed frame, rather than being stationary relative to the base frame. The bed frame is also limited in that it's non-tilting.

Therefore a primary object of the present invention is to provide a vehicle having load lifting bed moveable generally vertically between trailing and loading positions relative to the bed frame.

A further objective of the present invention is to provide a load lifting bed that is tiltable between loading and dumping positions relative to the bed frame.

A further objective of the present invention is to provide a vehicle with a load lifting bed which can be maintained in a horizontal position while moved between trailing and loading positions for easy loading and unloading of machinery or other objects being transported by the vehicle.

A still further objective of the present invention is to provide a vehicle with a load lifting bed that can be tilted from the horizontal position in either the trailing or loading position or any location of the bed therebetween.

A still further objective of the present invention is to provide a vehicle with a load lifting bed which uses a simple mechanism for moving the bed between trailing and loading positions having a new, safe design.

The means and method of accomplishing these and other objectives will become apparent in the following description of the invention.

BRIEF SUMMARY OF THE INVENTION

According to one aspect of the present invention, a center-pivot vehicle is disclosed. The center-pivot vehicle includes a forward section connected to selectively articulate relative to a rearward section by a rotary actuator. The rearward section includes a bed pivotably attached to a bed frame that is operatively attached to a trailer frame by a pivot plate operated by an actuator for moving the bed frame bed between trailing and loading positions. A second actuator connected between the bed and bed frame tilts the bed between loading and dumping positions.

A new method for operating a center-pivot vehicle having a bed movable both between trailing and loading positions and loading and dumping positions is disclosed. The method includes connecting first and second sections of the center-pivot vehicle together with a rotary actuator. The first and second sections are articulated relative to the each other for steering the vehicle by rotating the rotary actuator. Rotating a pivot plate operably connecting the bed frame to the trailer frame raises and lowers the bed frame and the bed between trailing and loading positions. Extending an actuator operably connecting the bed to the bed frame tilts the bed between loading and dumping positions.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings, in which:

DETAILED DESCRIPTION OF THE PREFERRED EMBODIMENT

The present invention includes a number of aspects, all of which have broad and far-reaching application. One aspect of the present invention relates to an apparatus and method for a center-pivot steering articulated vehicle wherein the system providing articulation of forward and rearward sections relative to each other is a rotary actuator, the system providing movement of the bed between trailing and loading positions is an actuated pivot plate, and the system providing tilting of the bed between loading and dumping positions is a linear extensible actuator.

Figure 1:
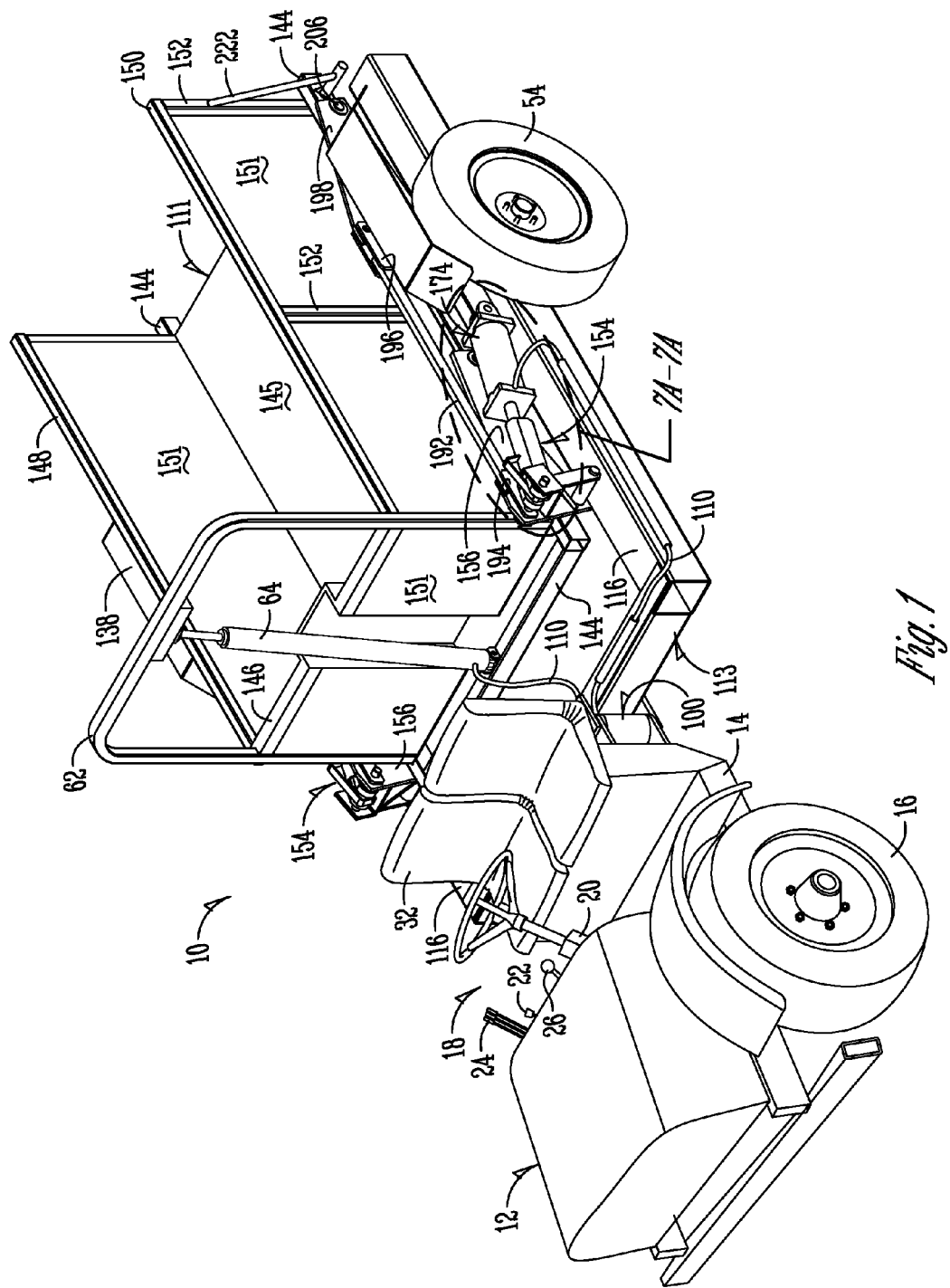
FIG. 1 is a perspective view of an exemplary embodiment of the center-pivot vehicle with the bed in the trailing position.
Figure 2:
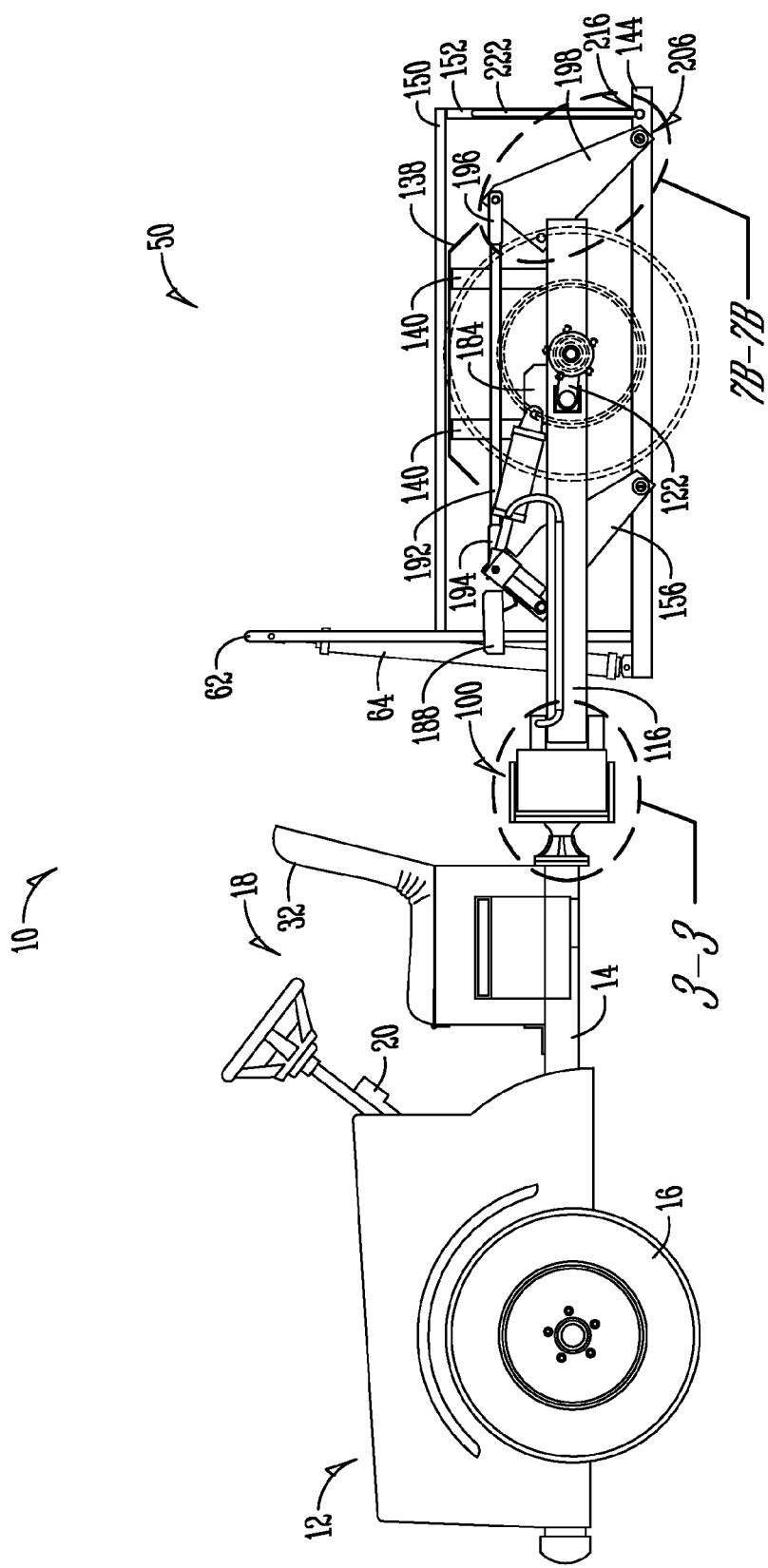
FIG. 2 is a side elevation view of the center-pivot vehicle with the bed in a loading position according to an exemplary aspect of the present invention.

Referring to the drawings, wherein like numerals represent like parts throughout the several views, there is generally disclosed a center-pivot vehicle at 10. The center-pivot vehicle 10 includes generally a forward section 12 having traversing means, such as wheels 16. The forward section 12 is operatively joined or connected to a rearward section 50 also having wheels 54. Forward section 12 and rearward section 50 are connected together by a rotary actuator 100 which, when actuated, causes forward section 12 and rearward section 50 to articulate relative to each other to provide turning for vehicle 10. As best illustrated in FIGS. 1-2, the forward section 12, or first wheel supported section in one embodiment of the invention, is built upon frame 14. Frame 14 preferably is constructed from square steel tubing, but may be fabricated from other materials such as aluminum. Frame 14 could also be fabricated from other assorted material types, such as pipe, I-beams, angle iron, plate steel, round bar, whether in steel, aluminum or another material type suitable for bearing the loads and stresses of center-pivot vehicle 10.

Frame 14 is supported by wheels 16 connected to the frame 14 by an axle, such as a standard stub axle or a Torflex axle as described in greater detail below. In a preferred embodiment, traversing means includes a rim and tire assembly as shown in FIGS. 1-2. The present invention contemplates other traversing means such as a track assembly or ski's for traversing various types of terrain during various seasons. The forward section 12 is shown having an operator's station 18. It should be appreciated that the present invention is sufficiently flexible to allow for components and functionality configured into the forward section 12 to be part of the rearward section 50. Similarly, components and functionality configured into the rearward section 50 may be configured or fabricated into the forward section 12 depending upon the desired design and functionality of the center-pivot vehicle 10. In one embodiment, the forward section 12 as shown in FIGS. 1-2 includes an engine (not shown) and an operator's station 18. The engine may be an electric or combustion engine. In the case where the engine is electric, an appropriate onboard and rechargeable power source could be supported by either the forward section 12 or rearward section 50 for providing electrical current to the motor. Preferably, the engine is a diesel or gas combustion engine. The engine may include a hydraulic pump (not shown) for providing a working fluid to perform one or more functions associated with operation of the vehicle. In the case where the engine includes hydraulic pump, wheels 16 and/or wheels 54 may be hydrostatically driven. The vehicle 10 may be front wheel driven or rear wheel driven. The vehicle 10 may also be either two wheel drive (2WD) or four wheel drive (4WD). The operator's station 18 may include one or more controls such as a drive engager 26 for engaging hydrostatic clutch and providing a driving force to wheels 16. Other controls such as throttle 22 may be provided for controlling the engine. The operator's station 18 includes one or more seats 32 for positioning an operator proximate vehicle controls. Preferably, operator's station 18 includes a steering control 20 whereby the operator provides instructional input to the rotary actuator 100 for articulating the forward section 12 and rearward section 50 relative to each other for turning vehicle 10. In a preferred form, steering control 20 comprises an orbital power hydraulic steering unit (see hydraulic steering control units, Eaton Corporation, Eaton Center, 1111 Superior Avenue, Cleveland, Ohio). Steering control 20 is in operable communication with hydraulic pump (not shown) and rotary actuator 100 whereby working fluid, such as hydraulic fluid, may be communicated from steering control 20 and hydraulic pump to rotary actuator 100. Steering control 20 may include other steering controls such as a joy stick or left and right hand control levers. Other operator controls may be positioned within operator's station 18 for controlling one or more functions of vehicle 10.

Figure 3:
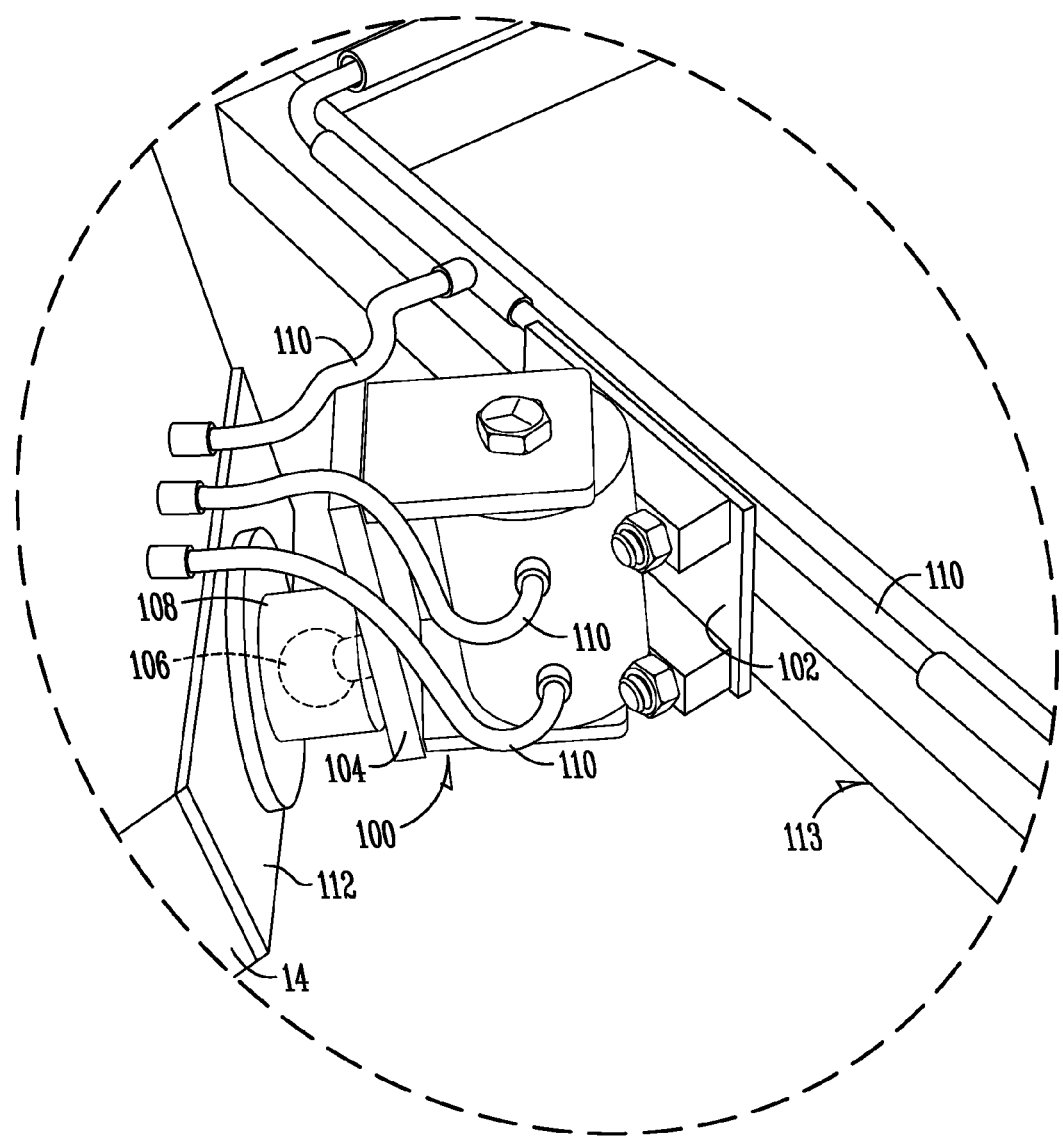
FIG. 3 is a perspective view of the center-pivot assembly taken along line 3-3 in FIG. 2.
Figure 5:
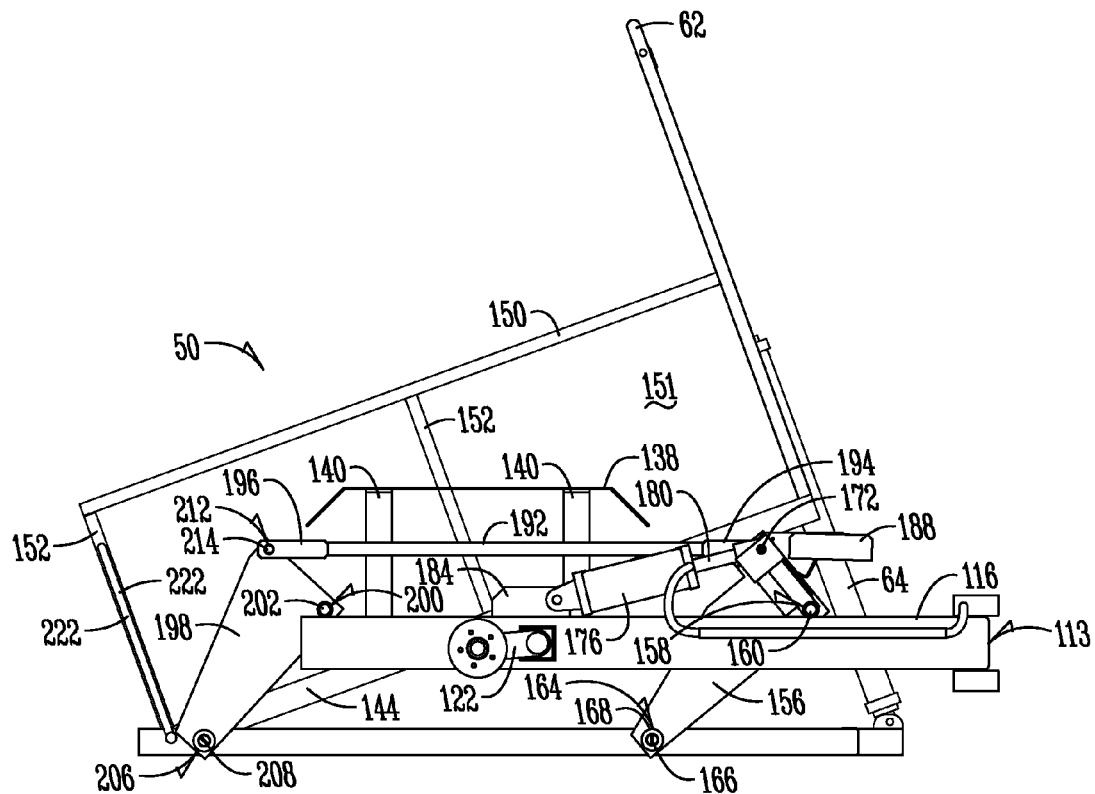
FIG. 5 is a side elevation view of the rearward section of the vehicle with the bed tilted in the dumping position and the wheel(s) not shown for purposes of illustration.
Figure 6:
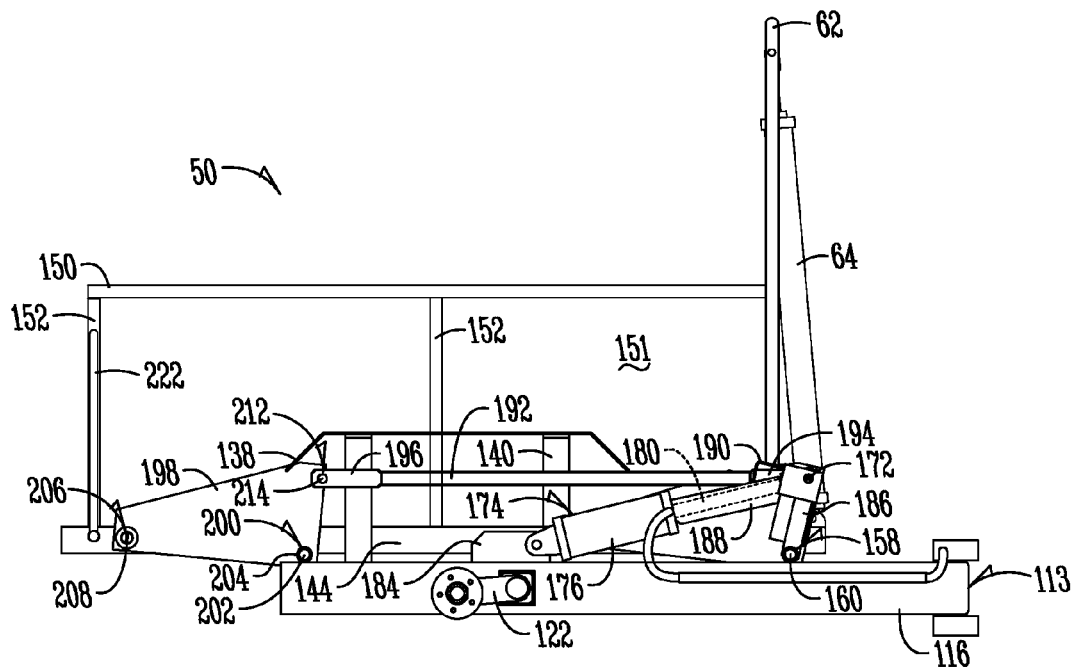
FIG. 6 is a side elevation view of the rearward section of the vehicle with the bed in the trailing position and the wheel(s) not shown for purposes of illustration.

As shown in FIGS. 1-2, rearward section 50 (or second wheel supported section in one embodiment of the present invention) comprises a trailer frame 113. The trailer frame 113 includes a pair of longitudinally extending frame members 116. The longitudinally extending frame members 116 may be constructed of steel square tubing, or tubing of another material type, shape or geometry. Mounting plate 102 shown in FIG. 3 is operatively attached to trailer frame 113. Pair of axles 122 and 124 shown in FIGS. 5-6 are also operatively attached to the longitudinally extending frame members 116 of the trailer frame 113. The axles are preferably a stub axle that extends at least partially through the longitudinally extending frame member 116 and terminates approximately adjacent the inside surface of the frame member. Axles 122 and 124 do not extend across the entire width of the bed, such as to the opposing side of the frame 113, but terminate at or near the interior surface of the longitudinally extending frame member 116 as shown and described. To support the weight of the frame and the cargo carried by the bed 111 it is preferred that axles 122 and 124 be a rubber ride type or Torflex axle, such as those provided by Dexter Axle Corp. or Axis Products, Inc., both in Elkhart, Ind. In another aspect of the present invention, axles 122 and 124 may be a standard stub axle. Operably attached to each axle 122 and 124 are wheels 54 which support the trailer frame 113 in an elevated position above the ground. In one aspect of the invention, a fender 138 is attached to each longitudinally extending frame member 116 and positioned over top of wheels 54. Fenders 138 are affixed to longitudinally extending frame member 116 by fender support arms 140.

Operably attached to the trailer frame 113 is a bed frame 144. Similarly, a bed 111 is operably attached to the bed frame 144. The bed 111 includes a floor 145 for supporting cargo. Bed railings 146-150 are affixed to the bed frame 144 by railing supports 152. The bed frame 144 is positioned between the longitudinally extending frame members 116 with the front end of the bed frame 144 being generally adjacent a forward portion of the trailer frame 113.

Figure 7A:
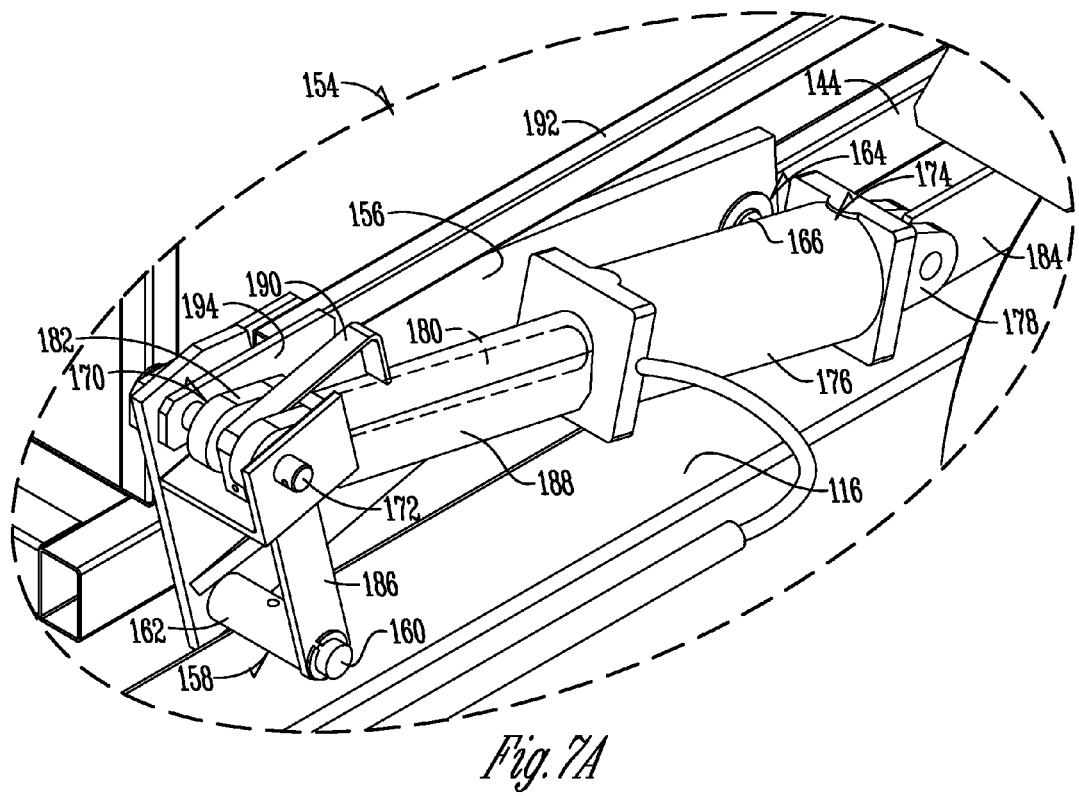
FIG. 7A is an enlarged view of the bed lifting and lowering assembly taken along line 7A-7A in FIG. 1.
Figure 7B:
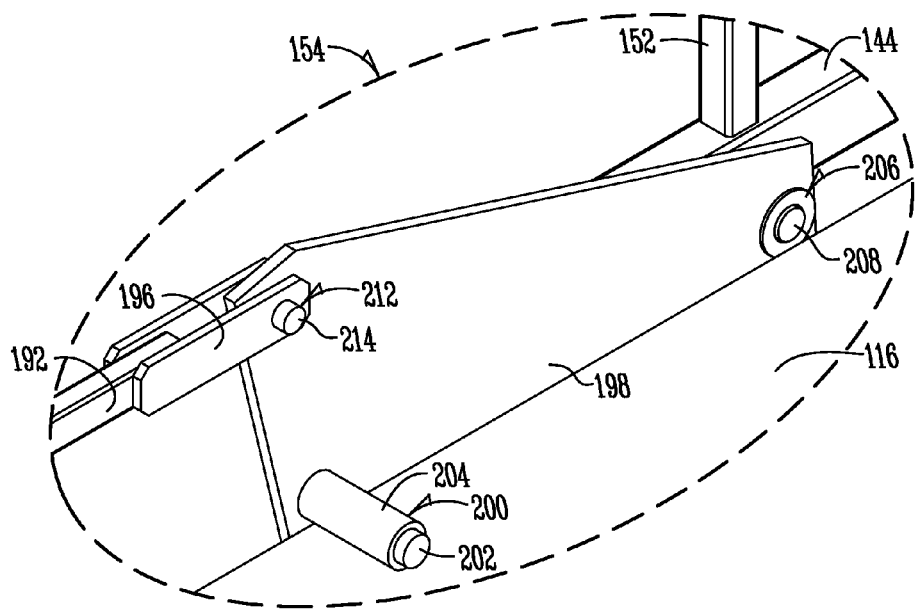
FIG. 7B is an enlarged view of the bed lifting and lowering assembly taken along line 7B-7B in FIG. 2.

As best illustrated in the figures, and particularly FIGS. 5, 6, 7A and 7B, the bed frame 144 is operably attached to the trailer frame 113 by a bed lifting and lowering assembly 154, as best illustrated in FIGS. 7A-B. The bed lifting and lowering assembly 154 (shown in FIG. 7A) includes a pivot plate 156 having a first connector 158 pivotally attached to a longitudinally extending frame member 116, a second connector 164 pivotally attached to bed frame 144 and a third connector 170 pivotally attached to the linear extensible actuator 174. The means for actuating pivot plate 156, such as a linear extensible actuator 174, is attached to the frame 116 and plate 156 via third connector 170. For example, a hydraulic cylinder having a first end may be pivotally attached to a longitudinally extending frame member 116 and its second opposite end pivotally attached to the third connector 170. Means for actuating pivot plate 156 include actuators driven hydraulically, pneumatically, electrically, or by any like means. The energy for actuating pivot plate 156 is preferably provided by an engine powering or on the vehicle 10, or an onboard battery. In the case where the means for actuating the pivot plate 156 is a linear extensible actuator 174, hydraulic line 110 from a hydraulic pump (not shown) provides working hydraulic fluid to linear extensible actuator 174.

In one aspect of the invention the first connector 158 includes a pivot pin 160 rigidly attached to the pivot plate 156. The pivot pin 160 is received within a sleeve 162 rigidly attached to a longitudinally extending frame member 116. Similarly, the second connector 164 includes a pivot pin 166 rigidly attached to the pivot plate 156. The pivot pin 166 is received within a sleeve 168 rigidly attached within the bed frame 144. For example, in the case where the bed frame 144 is constructed of generally square or rectangular tubing, sleeve 168 may be rigidly affixed to a hole extending through the sidewalls of the tubing (to allow the pin 166 to rotate/pivot within the sleeve 168) or the pin 166 may be received within a hole through the sidewalls of the tubing to allow the pin 166 to rotate/pivot within the hole. Likewise, the third connector 170 includes a pivot pin 172 received through the pivot plate 156. The pivot pin 172 also is received through holes in a clevis 182 attached to cylinder rod 180 of the linear extensible actuator 174. The pivot pin 172 also extends through an end bracket 186, wherein the opposite end of the end bracket 186 (opposite the end with the pivot pin) is attached to the pivot pin 160 of the first connector 158.

The linear extensible actuator 174 includes a barrel 176 with a first end comprising a pin eye 178 pivotally attached to mounting bracket 184. Mounting bracket 184 is affixed to a longitudinally extending frame member 116. A cylinder rod 180 is actuated in and out of the barrel 176. The cylinder rod 180 terminates in a clevis 182 which is a U-shaped fixture having holes passing through each of the legs of the U-shaped member. The pivot pin 172 of the third connector 170 is received through the holes in the clevis 182. The pivot pin 172 is also received through a hole in the pivot plate 156 and the end bracket 186. Also secured to the third connector 170 by pivot pin 172 is a piston lockout 188. The piston lockout 188 is in the form of a U-shaped channel/bracket and is hingeably attached to rotate about pivot pin 172 by hinge 190. A U-shaped bracket 194 having opposing holes in the legs is also attached to the third connector 170 by way of the pivot pin 172 passing through the holes of the U-shaped bracket 194. Attached to the U-shaped bracket 194 is a connecting arm 192 that extends from the front of the bed lifting and lowering assembly 154 to the rear of the bed lifting and lowering assembly 154 and is generally parallel to the longitudinally extending frame member 116 and bed frame 144. Opposite the U-shaped bracket 194 on connecting arm 192 is another U-shaped bracket 196 (shown in FIG. 7B). The U-shaped bracket 196 is identical to the other U-shaped bracket 194 and includes opposing holes extending through the leg portions of the bracket. The U-shaped bracket 196 is pivotally attached to pivot plate 198 by third connector 212. In a preferred aspect of the invention, the third connector 212 includes a pivot pin 214 extending through pivot plate 198 and U-shaped bracket 196 so as to pivotally secure and attach the U-shaped bracket 196 to pivot plate 198. Pivot plate 198 includes identical features to pivot plate 156. Pivot plate 198 includes a first connector 200 pivotally attached to a longitudinally extending frame member 116. In a preferred aspect of the invention, the first connector 200 includes a pivot pin 202 rigidly attached to the pivot plate 198. The pivot pin 202 is received within a sleeve 204 rigidly attached to a longitudinally extending frame member 116. The second connector 206 is pivotally attached to the bed frame 144, and in a preferred aspect of the invention includes a pivot pin 208 attached to the pivot plate 198. The pivot pin 208 is received within a sleeve 210 rigidly attached within the bed frame 144, similar to the second connector 164 described above. As previously discussed, the third connector 212 includes a pivot pin 214. The pivot pin 214 is received through holes in U-shaped bracket 196 and a hole in the pivot plate 198 to thereby allow U-shaped bracket 196 to pivot about pivot plate 198 when connecting arm 192 is actuated forward and rearward. Similarly, the connecting arm 192 may be pivotally pinned directly to pivot plates 156 and 198.

As discussed above, the bed 111 includes bed railings 146-150 connected to railing supports 152 and roll bar 62. The bed walls 151 are attached to the bed railings 146-150, railing supports 152 and roll bar 62. The floor 145 of the bed 111 is attached to floor support rails 224 connected at each of their opposite ends to a railing support 152 as best illustrated in FIG. 5. Thus, a railing support 152 on one side of the bed 111 is attached to a railing support 152 on the opposite side of the bed 111 by a floor support rail 224. The two railing supports 152 attached together at their lower ends by a floor support rail 224, together form a generally U-shaped frame member for supporting both the floor 145 and walls 151 of the bed 111. The bottom, back end of bed 111 is pivotally connected to the bed frame 144 by bed hinge 216. The bed hinge 216 includes a hinge bar 218 that extends across the width of the bed 111 and passes through holes in the bed frame 144. A hinge sleeve 220 is attached to the underside of the bed 111 at the back end. The hinge bar 218 extends through the hinge sleeve 220 and holes in the bed frame 144. On each side of the bed 111, a hinge support bar 222 connects the outer end of the hinge bar 218 to the adjacent railing support 152. At the front of the bed 111, a linear extensible actuator 64 is connected between the roll bar 62 and the bed frame 144. The actuator 64 is preferably a hydraulic cylinder connected to a hydraulic pump via hydraulic line 110. In operation, activation of the hydraulic pump (not shown) extends or retracts the actuator 64. When the actuator 64 is extended, the bed 111 tilts about the bed hinge 216 and relative the bed frame 144 as shown in FIG. 5. For example, in the horizontal position or the loading position, the bed 111 tilts to the dumping position by extension of actuator 64. Conversely, retraction of the actuator 64 moves the bed 111 from the dumping position to the horizontal or loading position or a position anywhere there between.

Figure 4:
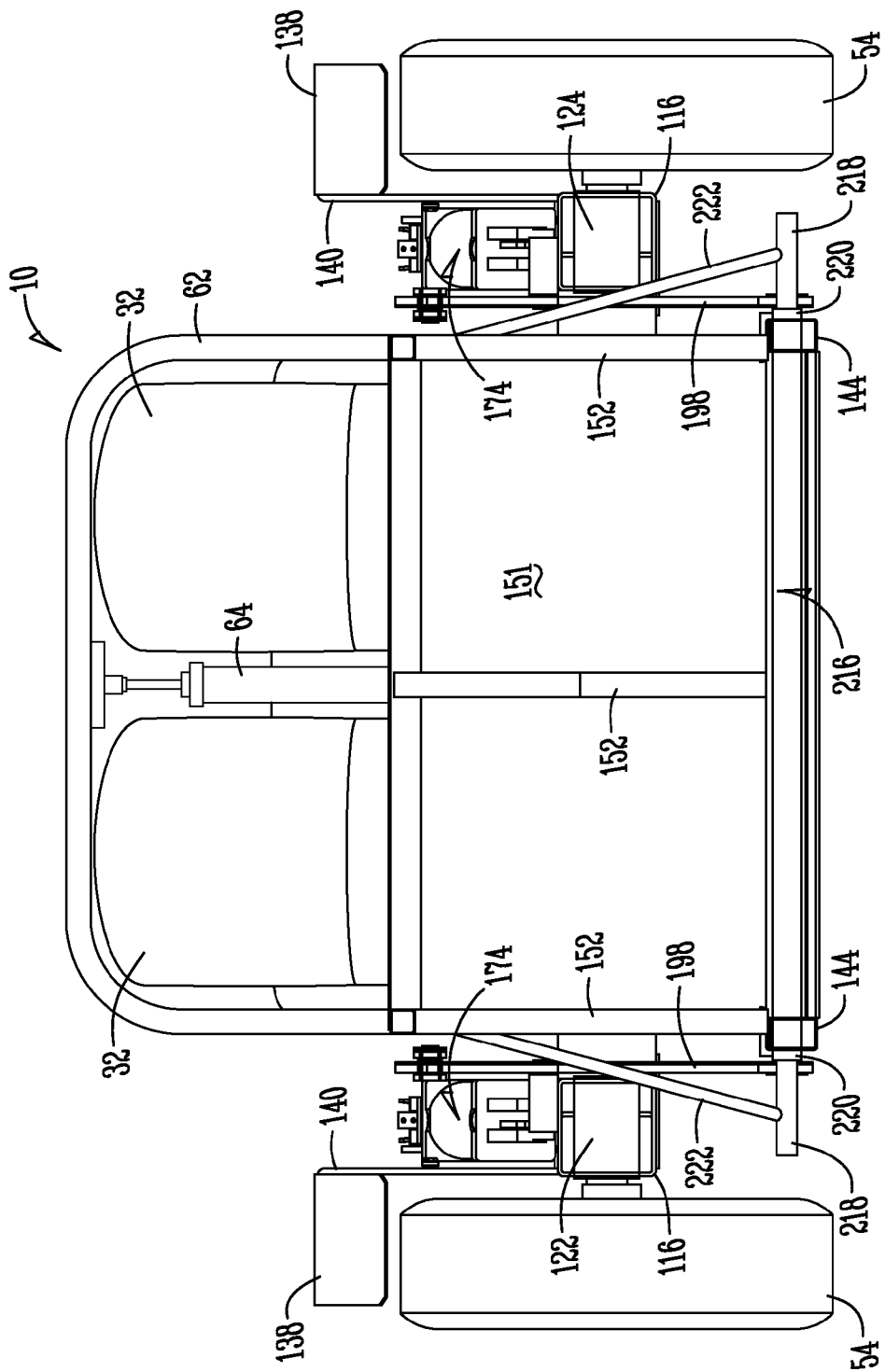
FIG. 4 is a rear elevation view of the present invention with the bed in the loading position.

Operation of the bed 111 is illustrated and shown by the figures and particularly FIGS. 5, 6, 7A and 7B. In FIG. 4, the bed 111 is shown in a loading position. In the loading position, the bed 111 is positioned adjacent the ground. In FIG. 5, the bed 111 is shown in the dumping position. In the dumping position, the front end of the bed 111 is tilted upward a distance from the bed frame 144. In FIG. 6 the bed 111 is shown in the trailing position. In the trailing position the bed 111 is generally level with and on the same plane as the bed frame 144.

The following describes movement of the bed frame 144 from the trailing to the loading position and visa versa. Movement of the bed frame 144 relative to the trailer frame 113 is provided by operably attaching bed frame 144 to the longitudinally extending frame members 116 of trailer frame 113. Generally, the pivot plate 156 and pivot plate 198 include a first connector 158 and 200 pivotally attached to a longitudinally extending frame member 116. Pivot plate 156 and 198 also include a second connector 164 pivotally attached to bed frame 144. The third connector 170 and 212 attached to pivot plates 156 and 198 respectively are linked together by connecting arm 192. The distance of separation between the first and second connectors on both pivot plates 156 and 198 is a sufficient distance so as to allow the bed frame 144 to descend a sufficient enough distance so as to lie adjacent the ground in the loading position in a generally horizontal position. Depending upon the height of the trailer frame 113 the appropriate spacing of the first and second connectors on both pivot plates may be calculated so that the bed frame 144 may be lowered a sufficient distance so as to position the bed frame 144 proximate the ground. Similarly, the spacing between the first and second connector on the pivot plate 156 and 198 may also be optimized so that the bed frame 144 moves from the loading to trailing position and visa versa with minimal extension and retraction of cylinder rod 180. Furthermore, the spacing of the first connector, second connector and third connector on the pivot plate 156 and pivot plate 198 may also be optimized so as to allow the linear extensible actuator 174 to have a mechanical advantage in moving the bed frame 144 between the trailing and loading positions or visa versa. In the trailing position, the cylinder rod 180 is in the extended position and locked out from movement by rotating and positioning the piston lockout 188 over the cylinder rod between the end of the barrel 176 and clevis 182 of the linear extensible actuator 174. Also, with the piston lockout 188 positioned over top the cylinder rod 180 the clevis 182 is prevented from retracting toward the barrel 176 of linear extensible actuator 174. With the piston lockout 188 positioned over top of the cylinder rod 180, the bed frame 144 is prevented from any movement relative to the trailer frame 113, and is positioned for trailing cargo. To move the bed frame 144 from the trailing position to the loading position, the piston lockout 188 is rotated out of obstruction between the barrel 176 and clevis 182 of the linear extensible actuator 174. Controls (not shown) operably attached to the engine 28 for operating a hydraulic pump (not shown) are operated to provide hydraulic fluid via hydraulic lines 110 to the linear extensible actuator 174 to allow cylinder rod 180 to retract into the barrel 176. Retraction of the cylinder rod 180 allows the bed frame 144 to descend toward the ground as pivot plates 156 and 198 rotate about first connectors 158 and 200. As the bed frame 144 descends toward the ground, second connector 164 and second connector 206 descend from the trailing position to the loading position, the descent being radial movement about the first connector 158 and 200. The radius of the radial movement being the distance between the first connector 158 and second connector 164 on pivot plate 156 and the distance between the first connector 200 and second connector 206 on pivot plate 198. To ensure that the bed frame 144 is fully engaging the ground, the cylinder rod 180 may be retracted to the point where the trailer frame 113 is lifted up off of the ground by retraction of cylinder rod 180 to firmly plant or secure the bed frame 142 and bed 111 against the ground for loading the bed 111 with cargo. With the connecting arm 192 pivotally attaching pivot plate 156 to pivot plate 198, any movement imparted to pivot plate 156 by linear extensible actuator 174 is also transmitted to pivot plate 198 via connecting arm 192. Thus, actuation of the linear extensible actuator 174 departs like motion to both pivot plates 156 and 198.

The bed frame 144 is moved from the loading position to the trailing position by operating the engine 28 connected to a hydraulic pump (not shown). Hydraulic fluid from the hydraulic pump causes the cylinder rod 180 within the linear extensible actuator 174 to extend out of the barrel 176. Extension of the cylinder rod 180 imparts a clockwise rotation to both pivot plate 156 and 198 about first connector 158 and 200 respectively. As the bed frame 144 ascends toward the trailing position, second connector 164 and 206 on pivot plates 156 and 198 pivot so as to maintain the bed frame 144 in a parallel orientation relative to the trailer frame 113. The cylinder rod 180 is extended until the bed frame 144 is generally parallel with or on the same plane as the trailer frame 113. This is accomplished by rotating both pivot plates 156 and 198 in a clockwise manner. The second connector 164 and 206 are rotated clockwise relative to first connectors 158 and 200 until generally on the same plate with first connectors 158 and 200. Thus, in the trailing position, the second connector 164 and 206 are generally in the same plane as the first connectors 158 and 200. In the loading position the second connector 164 and 206 lie in a plane generally parallel to the first connectors 158 and 200. Likewise, the trailing position, the third connectors 170 and 212 are generally in the same vertical plane as the first connectors 158 and 200. The present invention contemplates various pivot plate geometries or shapes yielding various desirable movement of the bed frame 144 relative to the trailer frame 113. For example, the pivot plate 156 and 198 could be designed in an oval or oblong shape or geometry, or even a cam shaped geometry so as to provide the linear extensible actuator 174 with mechanical advantage over the pivot plates 156 and 198 when moving the bed frame 144 from the loading position to the trailing position. Furthermore, the pivot plates 156 and 198 could be shaped so as to quicken the descent and ascent of the bed frame 144 relative to the trailer frame 113 while maintaining the same cylinder rod extension and retraction rates.

As set forth in the proceeding description, the bed 111 moves between trailing and loading positions by actuation of the bed lifting and lowering assembly 154. Also, by actuation of the linear extensible actuator 64 connected between the roll bar 62 and bed frame 144 the bed 111 is tilted from a loading position to a dumping position. The bed 111 may be tilted at any position of the bed frame 144 when moved between trialing and loading positions by the bed lifting and lowering assembly 154.

As previously discussed and as illustrated in FIG. 3, forward section 12 and rearward section 50 are connected by rotary actuator 100. Rotary actuator 100 may be hydraulically, pneumatically, mechanically, or electrically driven. Preferably, rotary actuator 100 is a hydraulic rotary actuator (see Helac Corporation, 225 Battersby Avenue, Enumclaw, Wash.). Rotary actuator 100 is attached to bed frame 113 of rearward section 50 by mounting plate 102. Rotary actuator 100 includes a pivot bracket 104 that upon actuation of rotary actuator 100 turns or rotates relative to rotary actuator 100. In a preferred form, a spindle and hub assembly is connected between pivot bracket 104 and frame 14 of forward section 12. Hub 108 may be attached to a mounting plate 112 secured to frame 14 of forward section 12. The spindle and hub assembly could alternatively be connected between rotary actuator 100 and mounting plate 102. The spindle and hub assembly includes a spindle 106 that is received within hub 108. The spindle and hub assembly allows the rearward section 50 to pitch and roll relative to the forward section 12, thus the rearward section 50 is able to pitch and roll independent of the pitch and roll experienced by the forward section 12. In other words, the rearward section 50 is able to float relative to the forward section 12 and vice versa. For example, in the case where the terrain differs between the forward and rearward sections 12, 50, both sections are able to independently pitch or roll to allow the traversing means to remain solidly grounded and true to the terrain. The independency of the forward section 12 and rearward section 50 provides increased stability, tracking and handling. This design also prevents the wear and tear which ordinarily would be experienced at the connective point between the rearward section and forward section of a center-pivot vehicle. In the case where rotary actuator 100 is a hydraulic rotary actuator, two hydraulic lines 110 from a hydraulic pump (not shown) provide working hydraulic fluid to rotary actuator 100 for rotating the actuator 100 in both clockwise and counter-clockwise directions. Operator input into steering control 20 causes working fluid from a hydraulic pump (not shown) to articulate or rotate pivot bracket 104 relative to rotary actuator 100 which in turn causes forward section 12 and rearward section 50 to articulate relative to each other for steering vehicle 10. For example, if an operator's input into steering control 20 is a clockwise turn of the wheel, working hydraulic fluid activates rotary actuator so as to rotate pivot bracket 104 clockwise to perform a right hand turn. Alternatively, if an operator provides a counterclockwise input into the wheel of steering control 20, hydraulic working fluid is communicated from a hydraulic pump to rotary actuator 100 to cause pivot bracket 104 to rotate counterclockwise to perform a left hand turn. An additional hydraulic line 110 may be provided for communicating working hydraulic fluid to hydraulic cylinder 174 for raising and lowering the bed frame 144 and the hydraulic cylinder 64 for tilting the bed 111. Working controls 24 may be positioned at operator station 18 of forward section 12 for receiving operator input and for controlling movement of the bed frame 144 relative to the trailer frame 113.

FIGS. 1-3 illustrate a method for controlling articulation of center-pivot vehicle 10. The method includes connecting forward section 12 and rearward section 50 of center-pivot vehicle 10 together using a rotary actuator 100. The method also includes the step of powering the rotary actuator 100 with engine (not shown). In a preferred form, the engine also includes a hydraulic pump (not shown) for providing a hydraulic working fluid to rotary actuator 100 for turning or rotating pivot bracket 104. A steering control 20 is provided at an operator station 18 of vehicle 10 whereby operator input into steering control 20 is communicated to rotary actuator 100. Operator input at steering control 20 communicated to rotary actuator 100 causes rotary actuator 100 to rotate or turn pivot bracket 104 clockwise or counter-clockwise depending upon the input by the operator at steering control 20. In a preferred form, the steering control 20 includes a hydraulic steering unit for controlling a hydraulic rotary actuator. In operation, an operator provides input through controls at the operator station 18 for controlling the engine, rotary actuator 100, and actuators 64 and 174. Operator's instructions for controlling the engine may be provided through standard controls such as throttle 22. Operator's instructions for driving the vehicle forward or in reverse may be provided through a drive engager 26. For example, in the case where the wheels are hydrostatically driven, drive engager 26 communicates a hydraulic working fluid from a hydraulic pump (not shown) to a hydrostatic drive unit operably connected to wheels 16 and/or 54 to drive the wheels either forward or rearward. An operator's instructions at steering control 20, whether a wheel, joy stick, or left and right hand controls, are communicated to rotary actuator 100. In the case where rotary actuator 100 is a hydraulic rotary actuator, steering control 20 may be an orbital power hydraulic steering unit as previously disclosed. Thus, the operator input at the steering control 20 causes working hydraulic fluid to be communicated from a hydraulic pump (not shown) to hydraulic rotary actuator 100 to cause pivot bracket 104 to rotate clockwise or counter-clockwise which, in turn, articulates forward section 12 relative to rearward section 50 to provide for vehicle turning. Further, operator's instruction for operating working body controls 24 may be communicated by operation of solenoid valves whereby hydraulic working fluid is communicated to hydraulic cylinder 174 for operating the bed frame 144 between the trailing and loading positions and/or to hydraulic cylinder 64 for operating the bed 111 between loading and dumping positions. In the case where vehicle 10 is hydrostatically driven, a hydrostatic clutch and drive system may be attached to one or more of the wheels of vehicle 10 whereby hydraulic working fluid from a hydraulic pump (not shown) is communicated to the hydraulic drive system for rotating wheels to drive vehicle 10 forward and in reverse.

The preferred embodiment of the present invention has been set forth in the drawings and in the specification and although specific terms are employed, these are used in the generically descriptive sense only and are not used for the purpose of limitation. Changes in the formed proportion of parts, as well as in the substitution of equivalents, are contemplated as circumstances may suggest or are rendered expedient without departing from the spirit and scope of the invention as further defined in the following claims.

What is claimed is:

1. A center-pivot vehicle comprising:
    a forward section connected to selectively articulate relative to a rearward section by a rotary actuator;
    one of said sections having a bed operably attached to a bed frame and the bed frame operably attached to a trailer frame;
    a first actuator and pivot plate connecting the bed frame to the trailer frame to move the bed frame between trailing and loading positions;
    a second actuator connecting the bed to the bed frame to move the bed between tilted and non-tilted positions; and
    wherein the trailer frame includes a pair of longitudinally extending frame members, each frame member having a pivot point pivotally connected to the pivot plate.

2. The center-pivot vehicle of claim 1 wherein said forward section comprises an operators station.

3. The center-pivot vehicle of claim 2 wherein said operator's station further comprises a steering control in communication with said rotary actuator for selectively articulating said rotary actuator for turning said vehicle.

4. The center-pivot vehicle of claim 1 wherein said rotary actuator comprises a hydraulic rotary actuator.

5. The center-pivot vehicle of claim 1 wherein the bed frame includes a pivot point pivotally connected to the pivot plate.

6. The center-pivot vehicle of claim 1 further comprises a spindle and hub connected between said forward section and said rotary actuator to allow said forward and rearward sections to pitch and roll relative to each other.

7. The center-pivot vehicle of claim 1 wherein the pivot plate further comprises a first connector pivotally attached to the trailer frame, a second connector pivotally attached to the bed frame, and a third connector pivotally attached to the first actuator.

8. The center-pivot vehicle of claim 1 wherein said actuator is a linear extensible actuator.

9. The center-pivot vehicle of claim 1 further comprising a second pivot plate pivotally connecting the bed frame to the trailer frame.

10. The center-pivot vehicle of claim 9 further comprising a connecting arm pivotally connected between the first and second pivot plates.

11. The center-pivot vehicle of claim 1 wherein the bed is pivotally attached to the bed frame.

12. The center-pivot vehicle of claim 1 wherein the second actuator comprises a linear extensible actuator having a first end pivotally connected to the bed frame and a second end connected to the bed.

13. A center-pivot vehicle comprising:
    a first wheel supported section connected to selectively articulate relative to a second wheel supported section by a rotary actuator;
    one of said wheel supported sections including:
        a. a frame having a pair of longitudinally extending frame members;
        b. a bed frame operatively attached to the pair of longitudinally extending frame members and a bed operably attached to the bed frame;
        c. a pivot plate having a first attachment point connected to the frame, a second attachment point connected to the bed frame, and a third attachment point connected to a first actuator; and
        d. a second actuator operably attached to the bed, wherein one end of the bed is hingedly attached to the bed frame and the other end is attached to the second actuator.

14. The center-pivot vehicle of claim 13 wherein the first actuator having an elevation control of the bed frame relative to the frame and said second actuator having an orientation control of the bed relative the bed frame.

15. A method for operating a center-pivot vehicle, comprising:
    connecting first and second sections of the center-pivot vehicle together with a rotary actuator;
    articulating said first and second sections relative to the each other for steering said vehicle by rotating said rotary actuator; and
    raising and lowering a bed frame relative to a frame of one of the sections by actuating a first actuator; and
    tilting a bed relative to the bed frame by actuating a second actuator, wherein the bed includes one end hingedly attached to the bed frame.

16. The method of claim 15 further comprising rotating a pivot plate with the first actuator for raising and lowering the bed frame.

17. The method of claim 16 further comprising tilting the bed independent of raising and lowering the bed frame.

* * * * *